US012594442B2

(12) United States Patent
Campbell et al.

(10) Patent No.: US 12,594,442 B2
(45) Date of Patent: Apr. 7, 2026

(54) FALL RESTRAINT SYSTEM

(71) Applicant: JMC Enterprises, Inc., Syracuse, NY (US)

(72) Inventors: Jonathan Campbell, Syracuse, NY (US); Joseph Palumbo, East Syracuse, NY (US)

(73) Assignee: JMC Enterprises, Inc., Syracuse, NY (US)

( * ) Notice: Subject to any disclaimer, the term of this patent is extended or adjusted under 35 U.S.C. 154(b) by 718 days.

(21) Appl. No.: 17/930,125

(22) Filed: Sep. 7, 2022

(65) Prior Publication Data

US 2023/0071404 A1 Mar. 9, 2023

Related U.S. Application Data

(60) Provisional application No. 63/242,232, filed on Sep. 9, 2021.

(51) Int. Cl.
*A62B 35/00* (2006.01)

(52) U.S. Cl.
CPC ...... *A62B 35/0056* (2013.01); *A62B 35/0037* (2013.01); *A62B 35/0068* (2013.01); *A62B 35/0075* (2013.01)

(58) Field of Classification Search
CPC . A62B 35/00; A62B 35/0006; A62B 35/0018; A62B 35/0025; A62B 35/0037; A62B 35/0043; A62B 35/005; A62B 35/0056; A62B 35/0068; A62B 35/0075; A62B 35/0081; A62B 35/0093; E04G 21/3214; E04G 21/3261; E04G 21/3276; E04G 21/328; E04G 21/3285; E04G 21/3295
See application file for complete search history.

(56) References Cited

U.S. PATENT DOCUMENTS

| | | | | |
|---|---|---|---|---|
| 5,092,426 | A * | 3/1992 | Rhodes | A62B 35/0068 269/228 |
| 8,978,820 | B2 | 3/2015 | Marini | |
| 2008/0041660 | A1* | 2/2008 | Marini | A62B 35/0056 182/36 |
| 2011/0101061 | A1* | 5/2011 | Schierenbeck | A62B 35/0025 224/661 |
| 2012/0193168 | A1* | 8/2012 | Taylor | A62B 35/0056 182/112 |
| 2014/0090927 | A1* | 4/2014 | Patton | E04G 5/001 182/112 |
| 2016/0303407 | A1* | 10/2016 | Galli | A62B 35/0056 |

(Continued)

FOREIGN PATENT DOCUMENTS

| | | | | |
|---|---|---|---|---|
| AU | 2002301550 | A1 * | 6/2003 | |
| EP | 2823860 | A1 * | 1/2015 | A62B 35/0056 |
| GB | 2419571 | A * | 5/2006 | A62B 35/0056 |

(Continued)

*Primary Examiner* — Kyle J. Walraed-Sullivan

(74) *Attorney, Agent, or Firm* — Harter Secrest & Emery LLP; Michael Nicholas Vranjes

(57) ABSTRACT

A fall restraint assembly, including a harness, at least one base line including a first end and a second end, a first line including a third end slidingly connected to the at least one base line and a fourth end connected to the harness, and a second line including a fifth end slidingly connected to the at least one base line and a sixth end connected to the harness.

16 Claims, 11 Drawing Sheets

(56) References Cited

U.S. PATENT DOCUMENTS

| | | | | |
|---|---|---|---|---|
| 2020/0114181 | A1 * | 4/2020 | Monahan | A62B 35/0018 |
| 2022/0145701 | A1 * | 5/2022 | Petitclerc | A62B 35/0068 |

FOREIGN PATENT DOCUMENTS

| | | | | | |
|---|---|---|---|---|---|
| GB | 2473284 | A | * | 3/2011 | A62B 35/0093 |
| JP | 07127240 | A | * | 5/1995 | |
| JP | 2022055189 | A | * | 4/2022 | |
| WO | WO-2009127002 | A1 | * | 10/2009 | A62B 35/0056 |

* cited by examiner

FALL RESTRAINT SYSTEM

CROSS-REFERENCE TO RELATED APPLICATIONS

This application claims the benefit under 35 U.S.C. § 119(e) of U.S. Provisional Patent Application No. 63/242,232, filed Sep. 9, 2021, which application is incorporated herein by reference in its entirety.

BACKGROUND OF THE DISCLOSURE

Field

The present disclosure relates to safety apparatuses, and more particularly, to a fall restraint assembly for use with semi-trailers and other tall structures that prevents injury from falling.

Description of Related Art

In geographic areas of significant snowfall, snow and ice on the roof of semi-trailers, also known as tractor-trailers, and other heavy machinery presents a significant driving hazard. Snow and ice accumulation on the roof of vehicles can come dislodged at driving speed and become airborne. This snow and ice can then cause significant harm to other vehicles and their occupants. Snow removal from semi-trailers prior to driving is currently mandated by the U.S. Department of Transportation in many northern states.

Current technology relies on a scraper system where semi-trailers travel underneath a fixed or moveable bar that removes the snow from the roof of the semi-trailer as it passes through the structure. However, these systems do not always completely remove ice and packed snow from the roof structure of the trailer and thus still present a hazard to other drivers.

In many instances it is necessary for a person to physically get on the roof of the semi-trailer to break up and remove ice and snow to best make the trailer safe. However, traversing the top of a semi-trailer that is covered in deep snow or ice also presents a significant hazard. Slippery conditions that are often accompanied by cold temperatures and reduced visibility present a harsh work environment and significant risk of a fall from the roof of the trailer.

SUMMARY

It is an object of the present disclosure to provide a safety apparatus and method.

An exemplary embodiment of the present disclosure provides a fall restraint assembly, including a harness, at least one base line including a first end and a second end, a first line including a third end slidingly connected to the at least one base line and a fourth end connected to the harness, and a second line including a fifth end slidingly connected to the at least one base line and a sixth end connected to the harness.

In some embodiments, the at least one base line includes a first base line and a second base line, the first line is connected to the first base line, and the second line is connected to the second base line. In some embodiments, the first end is fixedly secured at a first point and the second end is fixedly secured at a second point. In some embodiments, the at least one base line includes at least one travel stop operatively arranged to prevent displacement of the third end. In some embodiments, the at least one base line includes a tensioner. In some embodiments, the fall restraint assembly further including a line guide assembly, the line guide assembly including a connector operatively arranged to engage the at least one base line. In some embodiments, the line guide assembly further includes a first arm, a second arm pivotably and translatably connected to the first arm, and a clamp operatively arranged to lock the second arm with respect to the first arm. In some embodiments, the line guide assembly includes a sheath.

In some embodiments, the harness includes a plurality of straps, and at least one anchor loop, wherein at least one of the fourth end and the sixth end are connected to the at least one anchor loop. In some embodiments, the harness includes a first anchor loop, a second anchor loop, a first connecting line extending from the first anchor loop to the second anchor loop in a first circumferential direction, and a second connecting line extending from the first anchor loop to the second anchor loop in a second circumferential direction, opposite the first circumferential direction. In some embodiments, the fourth end is slidably connected to the first connecting line and the sixth end is slidably connected to the second connecting line. In some embodiments, the first end includes a standoff connector.

An exemplary embodiment of the present disclosure provides a fall restraint assembly for a semi-trailer including a forward fixation point and a rear fixation point, the fall restraint assembly including a harness, a first base line including a first end arranged to be connected to the forward fixation point and a second end arranged to be connected to the rear fixation point, a second base line including a third end arranged to be connected to the forward fixation point and a fourth end arranged to be connected to the rear fixation point, a first line including a fifth end slidingly connected to the first base line and a sixth end connected to the harness, and a second line including a seventh end slidingly connected to the second base line and an eighth end connected to the harness.

In some embodiments, at least one of the first base line and the second base line includes at least one travel stop. In some embodiments, at least one of the first base line, the second base line, the first line, and the second line includes a tensioner. In some embodiments, the fall restraint assembly further includes a line guide assembly, the line guide assembly including a connector operatively arranged to engage the first base line. In some embodiments, the line guide assembly further includes a first arm, a second arm pivotably and translatably connected to the first arm, and a clamp operatively arranged to lock the second arm with respect to the first arm. In some embodiments, the harness includes a plurality of straps, and at least one anchor loop, wherein at least one of the fourth end and the sixth end are connected to the at least one anchor loop. In some embodiments, the harness includes a first anchor loop, a second anchor loop, a first connecting line extending from the first anchor loop to the second anchor loop in a first circumferential direction, and a second connecting line extending from the first anchor loop to the second anchor loop in a second circumferential direction, opposite the first circumferential direction. In some embodiments, the sixth end is slidably connected to the first connecting line and the eighth end is slidably connected to the second connecting line.

A first exemplary embodiment of the present disclosure provides an apparatus for safety. The apparatus includes a first line removably affixed between a bottom side of a first end of an object and the bottom side of a second end of the object, the first line having a first longitudinal axis extending between the first end and the second end, the object having a longitudinal axis, and a second line removably affixed between the bottom side of the first end of an object and the bottom side of a second end of the object, the second line having a second longitudinal axis extending between the first end and the second end. The apparatus further includes a third line removably slidably attached to the first line at a first end of the third line, the third line operable to slide along the first longitudinal axis of the first line, and a fourth line removably slidably attached to the second line at a first end of the fourth line, the fourth line operable to slide along the second longitudinal axis of the second line. The apparatus still further includes a harness removably attached to a second end of the third line and a second end of the fourth line.

A second exemplary embodiment of the present disclosure provides a method. The method includes providing a first line removably affixed between a bottom side of a first end of an object and the bottom side of a second end of the object, the first line having a first longitudinal axis extending between the first end and the second end, the object having a longitudinal axis, and providing a second line removably affixed between the bottom side of the first end of an object and the bottom side of a second end of the object, the second line having a second longitudinal axis extending between the first end and the second end. The method further includes providing a third line removably slidably attached to the first line at a first end of the third line, the third line operable to slide along the first longitudinal axis of the first line, and providing a fourth line removably slidably attached to the second line at a first end of the fourth line, the fourth line operable to slide along the second longitudinal axis of the second line. The method still further includes providing a harness removably attached to a second end of the third line and a second end of the fourth line.

These and other objects, features, and advantages of the present disclosure will become readily apparent upon a review of the following detailed description of the disclosure, in view of the drawings and appended claims.

BRIEF DESCRIPTION OF THE SEVERAL VIEWS OF THE DRAWING(S)

Various embodiments are disclosed, by way of example only, with reference to the accompanying schematic drawings in which corresponding reference symbols indicate corresponding parts, in which.

DETAILED DESCRIPTION

Figure 1:
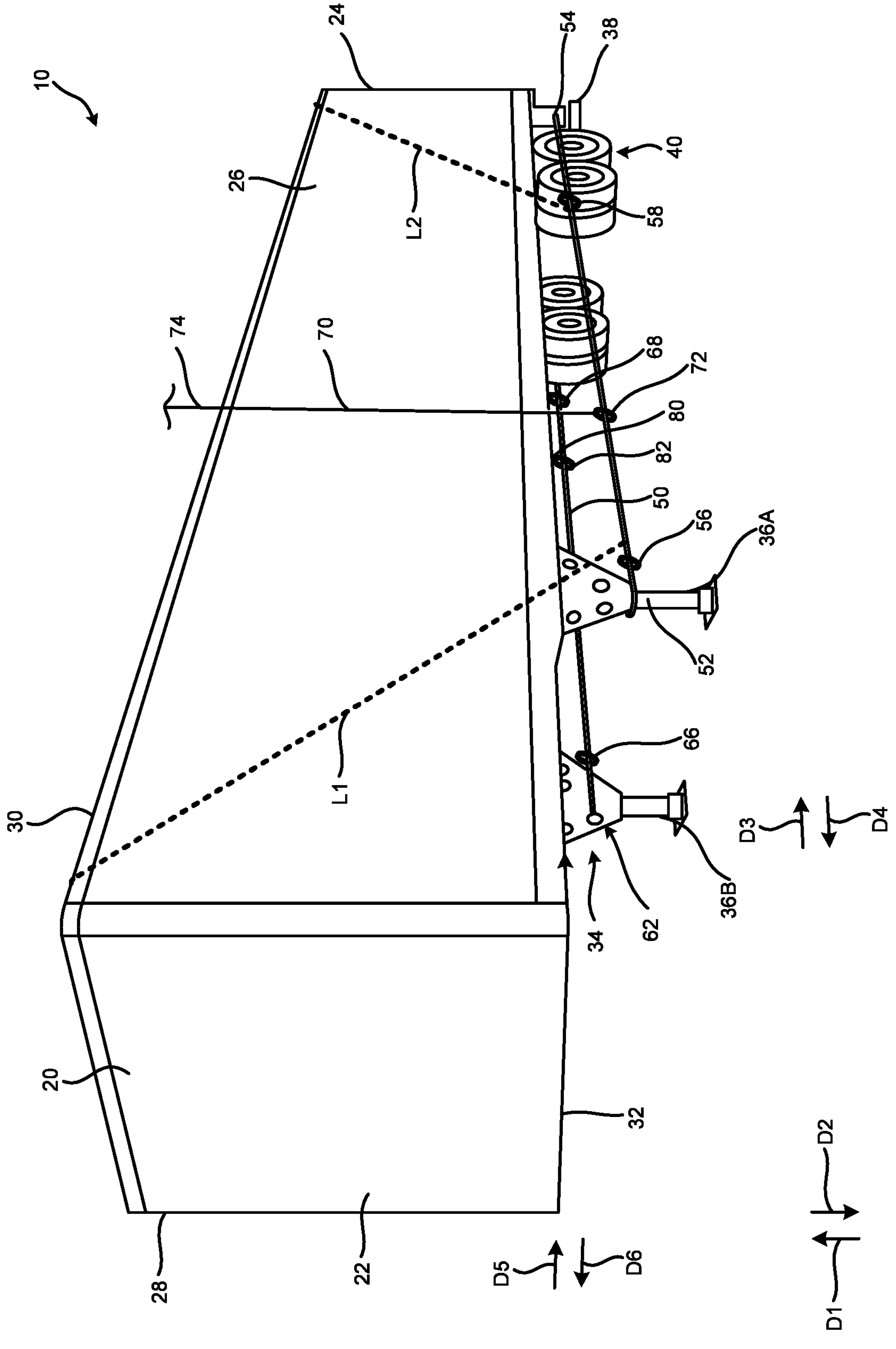
FIG. 1 is a front perspective view of a fall restraint assembly, in accordance with embodiments of the present disclosure.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

Embodiments of the safety apparatus described herein include an anchoring system that is attached to a semi-trailer and does not require any external anchoring. Embodiments of the present disclosure can be easily packaged such that it can be easily transported by a single user (e.g., in a bag or backpack) and can be rapidly deployed by one or two users.

An exemplary apparatus includes a first line, a second line, a third line, and a fourth line. Embodiments provide that the first line, the second line, the third line, and the fourth line are cables, nylon fabric, or a combination of both. The first line and the second line extend along the x-axis of the semi-trailer, the x-axis being designated generally by direction D3 and direction D4 as shown in FIG. 1. In one embodiment, the first line extends along the x-axis on one side of the semi-trailer between the landing gear and the rear bumper, and is removably attached to the landing gear and the rear bumper. In another embodiment, the second line extends along the x-axis on the other side of the semi-trailer between the landing gear and the rear bumper, and is removably attached to the landing gear and the rear bumper. The first line and the second line in some embodiments can include a tensioner that can automatically or manually (e.g., via a ratcheting mechanism) lengthen or shorten the first line and the second line.

The third line extends along the y-axis, the y-axis designated generally by direction D1 and direction D2, between the first line and a harness for a user. The third line is removably and slidably attached to the first line such that the third line can slide along the longitudinal axis of the first line. The fourth line extends along the y-axis between the second line and the harness for the user. The fourth line is removably and slidably attached to the second line such that the fourth line can slide along the longitudinal axis of the second line. Embodiments of the first line and the second line include one or more stops located adjacent to the landing gear and a front rear wheel which prevent or obstruct the movement of the third line and the fourth line along the first line and the second line, respectively.

The third line and the fourth line have a length that allows a user on the top of the semi-trailer to move freely along and throughout the entire top of the semi-trailer. The third and the fourth line have a length that, in conjunction with the amount of bow or bend in the first line and the second line, respectively, do not allow the third line or the fourth line to extend over two vertical sides and the top of the semi-trailer or the top corners of the semi-trailer. In other words, when the third line and the fourth line are attached to a harness on the top of a semi-trailer, the third line and the fourth line prevent the harness from reaching an edge of the trailer. The y-axis movement range is restricted by tension in x-axis cables and the stops on the x-axis cables and appropriate tensioning of the cables. The z-axis movement is restricted by the x-axis cable tension, the z-axis being designated by direction D5 and direction D6 as shown in FIG. 1.

Embodiments of the present disclosure provide a harness for a user. Embodiments of the harness include two shoulder straps and a waist strap affixed to the two shoulder straps. The waist strap includes a first anchor loop removably affixed to a first end of the waist strap, and a second anchor loop removably affixed to a second end of the waist strap. The harness further includes a first connecting line removably affixed between the first anchor loop and the second anchor loop. The harness also includes a second connecting line removably affixed between the first anchor loop and the second anchor. Embodiments of the anchor loop include a D-ring, loop, or carabiner clip. Embodiments include the first anchor loop and the second anchor loop being located such that they are positioned on the hips of the user. Embodiments further include the first connecting line and the second connecting line being replaced by a single loop that is connected to the first anchor loop and the second anchor loop. Embodiments of the harness include the first connecting line being removably and slidably attached to the third line and the second connecting line being removably and slidably attached to the fourth line. Embodiments of the shoulder straps and the waist straps are operable to be adjusted such that their length can be increased or decreased.

Embodiments may further include standoffs along the x-axis or y-axis cable length to prevent cable abrasion or damage to the semi-trailer, or to maintain controlled tension of the cable. Cable protection (e.g., coatings, concentric tubular structures, or standoffs) may also be applied to prevent abrasion of the cables to improve longevity of the cables. Embodiments also include the use of springs or other elongation/tensioning devices can be added to the x-axis and y-axis cables to allow for motion along the z-axis.

While specific embodiments described herein reference semi-trailers, embodiments are also applicable to roof tops and other types of vehicles that require removal of snow, ice, or debris from their roofs, or require cleaning or other maintenance. Embodiments provide for multi-axis, semi-restricted movement such that a user can be safely harnessed and protected from a fall from a height. Embodiments provide that a user can safely move about an object having a height because opposite axial cables apply opposing forces such that the user always has one line under tension from either side of the object the user is on top of.

Figure 2:
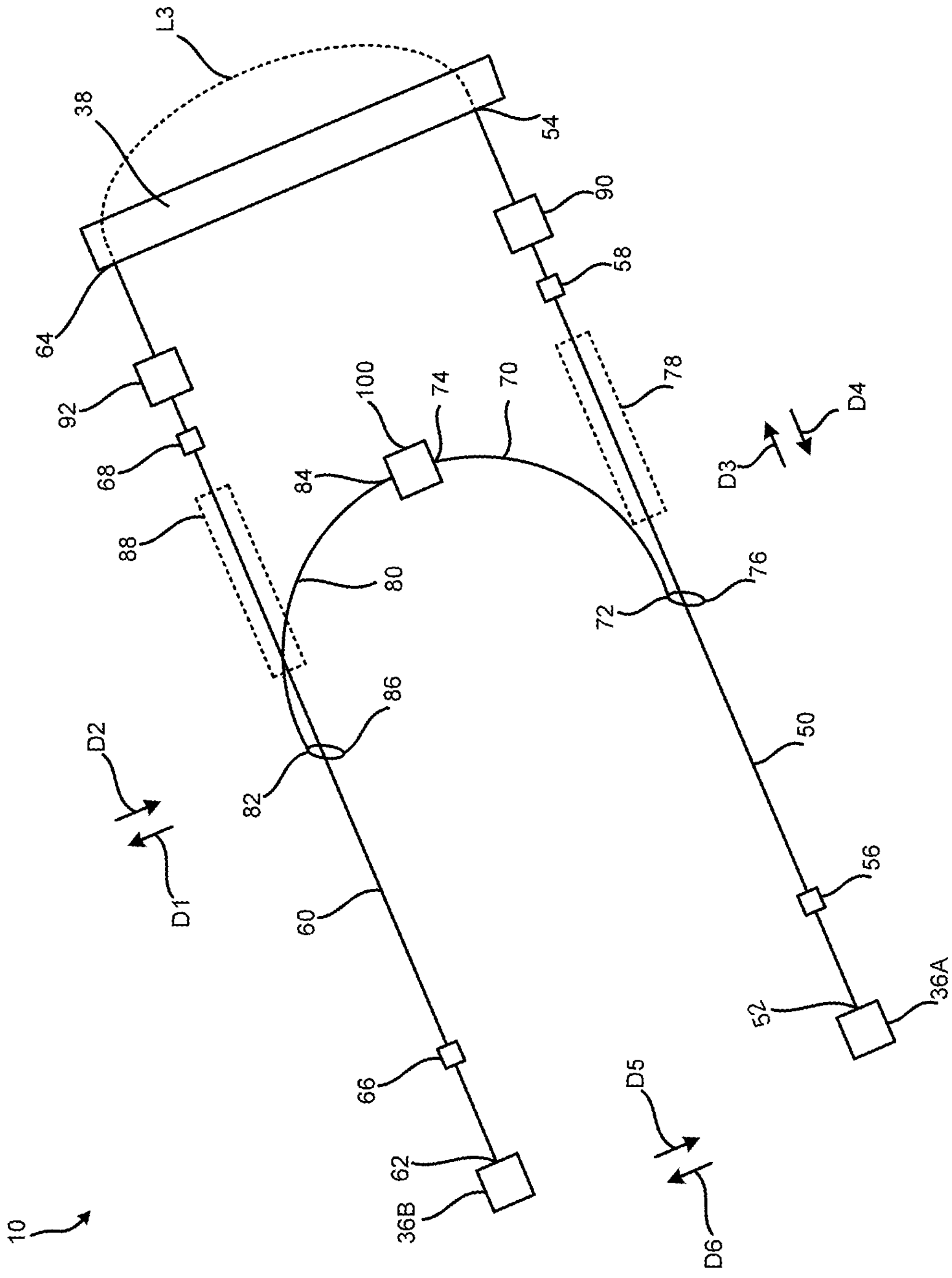
FIG. 2 is a perspective schematic view of a fall restraint assembly, in accordance with embodiments of the present disclosure.
Figure 3:
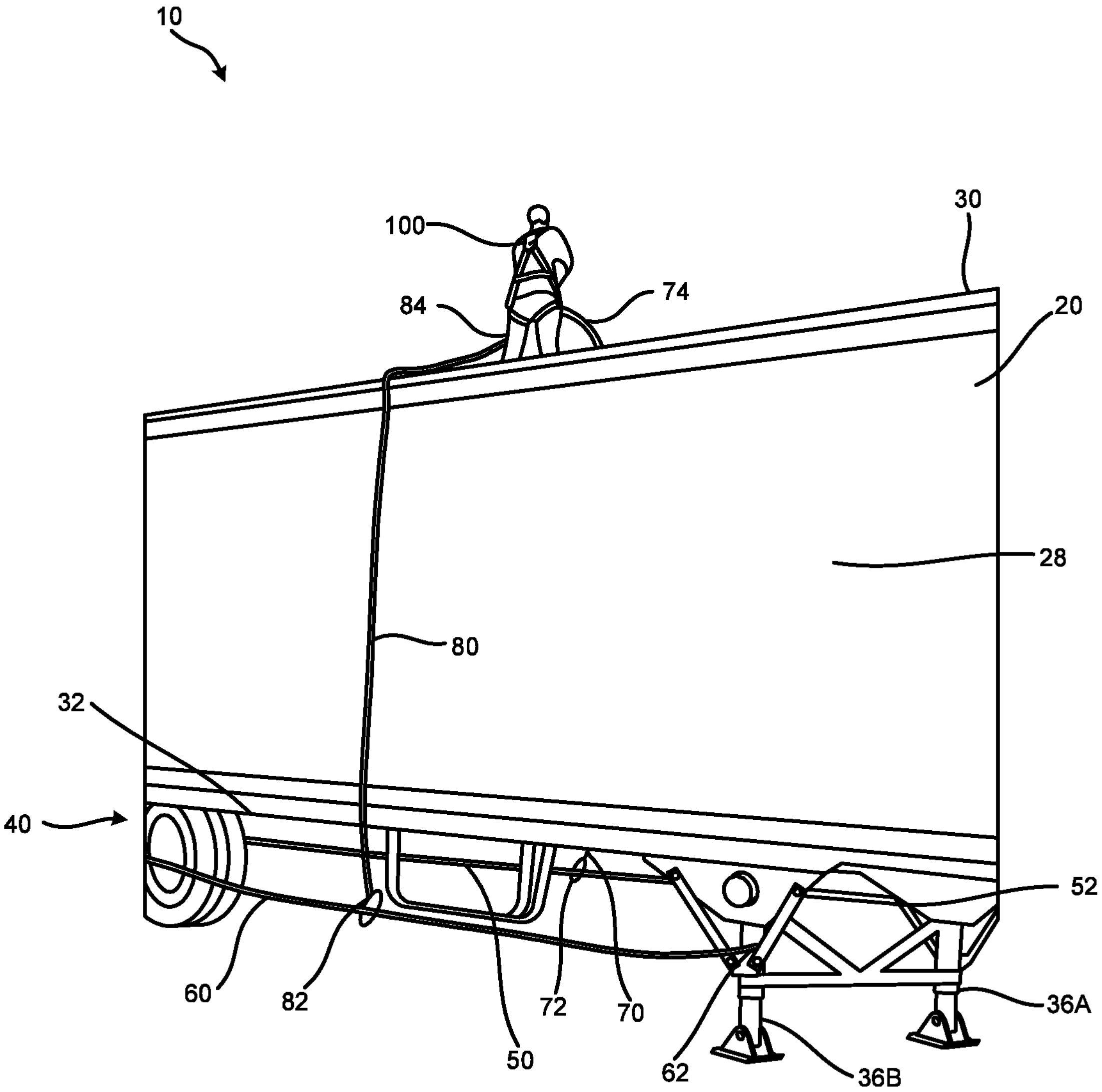
FIG. 3 is a partial perspective view of a fall restraint assembly, in accordance with embodiments of the present disclosure.
Figure 4:
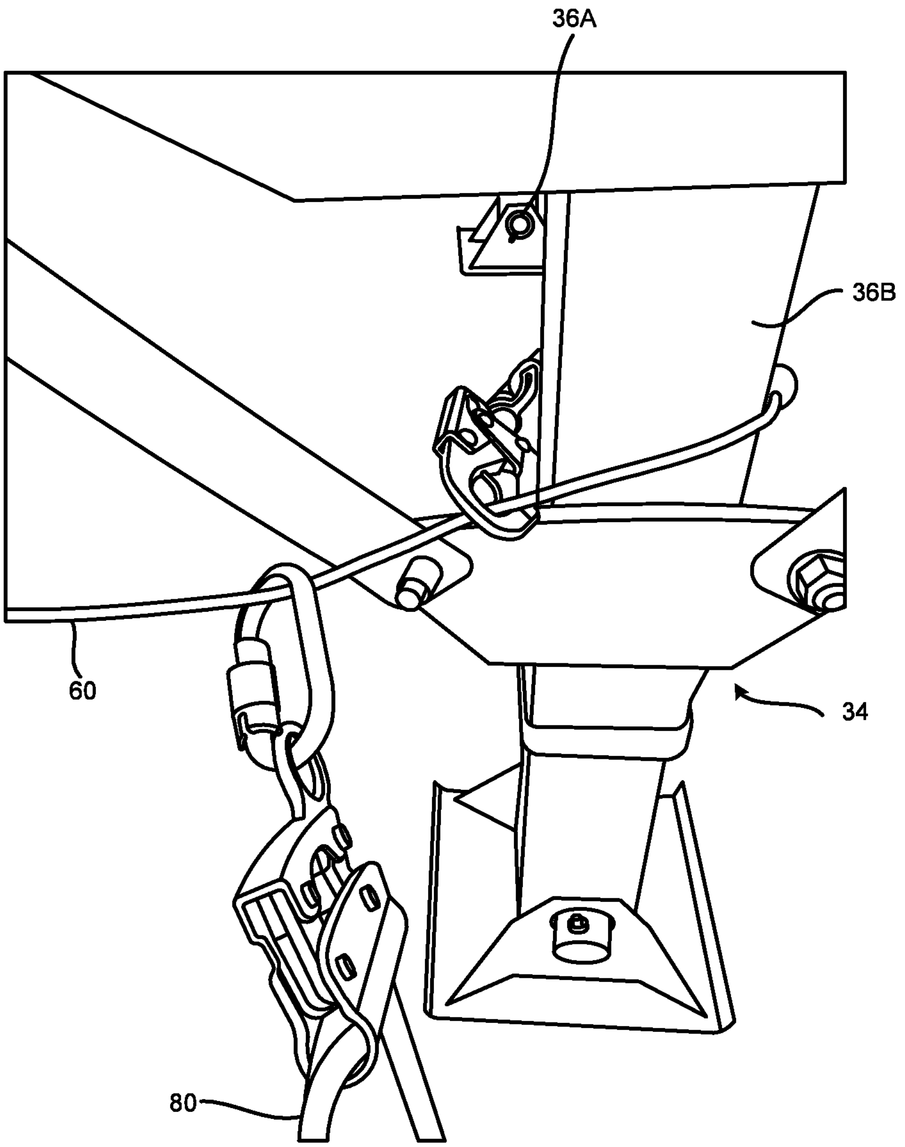
FIG. 4 is a partial perspective view of a fall restraint assembly, in accordance with embodiments of the present disclosure.

Adverting now to the figures, FIG. 1 is a front perspective view of fall restraint assembly 10. FIG. 2 is a perspective schematic view of fall restraint assembly 10. FIG. 3 is a partial perspective view of fall restraint assembly 10. FIG. 4 is a partial perspective view of fall restraint assembly 10. Fall restraint assembly 10 comprises at least one line arranged generally horizontally in direction D3 and direction D4, for example, line or base line 50 and line or base line 60, at least one line arranged generally vertically in direction D1 and direction D2, for example, line 70 and line 80, and harness 100.

In some embodiments, fall restraint assembly 10 is arranged on semi-trailer or tractor-trailer 20; however, it should be appreciated that fall restraint assembly 10 can be utilized for any infrastructure where falling is a risk, for example, a building, bridge, aircraft, etc. Semi-trailer 20 comprises front 22, rear 24, side 26, side 28, top 30, and bottom 32. Semi-trailer 20 further comprises front support or landing gear 34 extending in direction D2 from bottom 32. Landing gear 34 comprises at least one leg, for example, leg 36A and leg 36B. Legs 36A-B may be extendable and retractable, for example, when semi-trailer 20 is not connected to a semi-truck and connected to a semi-truck, respectively. Landing gear 34 may comprise other support componentry known in the art, for example, leg sleeves to which legs 36A-B are telescopingly engaged, landing gear feet connected to the distal ends of legs 36A-B (and engage the ground surface), one or more gussets extending between bottom 32 and lets 36A-B to add support, additional support beams, etc. Semi-trailer 20 further comprises rear impact guard or bumper 38 arranged proximate rear 24 and one or more wheels 40. It should be appreciated that landing gear 34 and bumper 38 are fixedly secured to semi-trailer 20, for example bottom 32, such that they provide adequate anchoring points for fall restraint assembly 10. For the purposes of this disclosure, directions D3 and D4 define an x-axis, directions D1 and D2 define a y-axis, and directions D5 and D6 define a z-axis.

Line 50 is a cable, rope, strap, chain, string, or the like comprising end 52 and end 54. Line 50 is operatively arranged to be secured in a generally horizontal fashion, and acts as a base to which one or more vertical lines, for example lines 70, 80 are connected. In some embodiments, end 52 is connected to landing gear 34, for example, leg 36A, and end 54 is connected to bumper 38. In some embodiments, line 50 comprises one or more travel stops, for example travel stop 56 and travel stop 58, operatively arranged to limit sliding movement of end 72 of line 70, as will be described in greater detail below. Travel stops 56, 58 are fixedly secured to line 50 at a predetermined location. For example, travel stop 56 is fixedly secured to line 50 proximate end 52 and travel stop 58 is fixedly secured to line 50 proximate end 54. In some embodiments, travel stops 56, 58 comprise a bumper, clamp, or other mechanism operatively arranged to stop connector 76 from traveling along line 50. In some embodiments, line 50 may further comprise tensioner 90 operatively arranged to remove slack in line 50 and keep it taught (i.e., reducing displacement of line 50 in directions D1 and D2). Tensioner 90 may comprise a spring, ratcheting device, turnbuckle (see FIGS. 6-7), winch, rope grab, and/or the like. In some embodiments, tensioner 90 is arranged between travel stop 58 and end 54. In some embodiments, tensioner 90 is arranged between travel stop 56 and end 52. In some embodiments, fall restraint system 10 may further comprise tube or sheath 78 through which line 50 extends. Sheath 78 is operatively arranged to protect line 50 or components of semi-trailer 20 from wear. For example, sheath 78 may engage wheels 40 such that line 50 does not cause damage due to frictional engagement therewith. Sheath 78 may be secured to wheels 40 to maintain engagement therewith and provide added support for line 50. Ends 52 and 54 of line 50 may be connected to semi-trailer 20 via any suitable means, for example, a choker hitch (see FIG. 4), a clamp, a carabiner, a J-hook, etc. In some embodiments, end 54 is connected inside the vertical upright material of bumper 38 to prevent the connector for line 50 from slipping or detaching from bumper 38 and to provide sufficient load support.

Line 60 is a cable, rope, strap, chain, string, or the like comprising end 62 and end 64. Line 60 is operatively arranged to be secured in a generally horizontal fashion, and acts as a base to which one or more vertical lines, for example lines 70, 80 are connected. In some embodiments, end 62 is connected to landing gear 34, for example, leg 36B, and end 64 is connected to bumper 38. In some embodiments, line 60 comprises one or more travel stops, for example travel stop 66 and travel stop 68, operatively arranged to limit sliding movement of end 82 of line 80, as will be described in greater detail below. Travel stops 66, 68 are fixedly secured to line 60 at a predetermined location. For example, travel stop 66 is fixedly secured to line 60 proximate end 62 and travel stop 68 is fixedly secured to line 60 proximate end 64. In some embodiments, travel stops 66, 68 comprise a bumper, clamp, or other mechanism operatively arranged to stop connector 86 from traveling along line 60. In some embodiments, line 60 may further comprise tensioner 92 operatively arranged to remove slack in line 60 and keep it taught. Tensioner 92 may comprise a spring, ratcheting device, turnbuckle (see FIGS. 6-7), winch, rope grab, and/or the like. In some embodiments, tensioner 92 is arranged between travel stop 68 and end 64. In some embodiments, tensioner 92 is arranged between travel stop 66 and end 62. In some embodiments, fall restraint system 10 may further comprise tube or sheath 88 through which line 60 extends. Sheath 88 is operatively arranged to protect line 60 or components of semi-trailer 20 from wear. For example, sheath 88 may engage wheels 40 such that line 60 does not cause damage due to frictional engagement therewith. Sheath 88 may be secured to wheels 40 to maintain engagement therewith and provide added support for line 60. Ends 62 and 64 of line 60 may be connected to semi-trailer 20 via any suitable means, for example, a choker hitch, a clamp, a carabiner, a J-hook, etc. In some embodiments, end 64 is connected inside the vertical upright material of bumper 38 to prevent the connector for line 60 from slipping or detaching from bumper 38 and to provide sufficient load support.

It should be appreciated that fall restraint assembly 10 may comprise one or more standoffs to prevent line abrasion, damage to trailer paint, or maintain controlled tension on the lines, as will be described below. Line protection such as coatings, concentric tubular structures (e.g., sheath 78 and sheath 88), or standoffs may also be applied to prevent abrasion of the lines, to improve device longevity. For example, sheath 78, 88 may be a solid or hollow rod that is attached to wheels 40, for example using ratchet straps, clamps, or other securement means. Sheath 78, 88 may comprise a standoff to move the sheath outward from the wheels 40, past the edge of semi-trailer 20. In embodiments wherein sheath 78, 88 is a solid rod, a threaded hole at each end is mated with a threaded eye-bolt to attach to line 50, 60 at each end, for example, via a carabiner. In embodiments wherein sheath 78, 88 is a hollow rod, line 50, 60 may pass through the center of the rod. In some embodiments, sheath 78, 88 comprises a protective element (e.g., a bumper, a plastic insert, rubber or foam or inflatable bumper, etc.) that protects the trailer, wheels, or other components thereof from abrasion from the lines.

In some embodiments, line 50 and line 60 are comprised of one single line connected at each end to legs 36A-B and wrapped around bumper 38, as illustrated by line L3. In some embodiments, line 50 and line 60 are comprises of one single line connected at each end to bumper 38 and wrapped around legs 36A-B. Such embodiments would require less connectors. It should be appreciated, that in some embodiments fall restraint assembly 10 comprises only one horizontal line extending from landing gear 34 to bumper 38, and both lines 70 and 80 are connected thereto.

In some embodiments, a structural frame component may be connected to both legs 36A and 36B, with lines 50 and 60 connected to the structural frame component. The structural frame component may have two sets of flanges that engage legs 36A-B. The structural frame component may comprise angled plate, floor framing, cross bars, etc. Tension is applied from the rear end of semi-trailer tightening the structural frame component into position.

Line 70 is a cable, rope, strap, chain, string, or the like comprising end 72 and end 74. Line 70 is operatively arranged to be secured in a generally vertical fashion, and connects harness 100 to line 50. End 72 is slidingly connected to line 50 via connector 76 (e.g., clip carabiner, loop, D-ring, etc.). End 74 is connected to harness 100, as will be described in greater detail. End 72 is operatively arranged to slide along line 50 between ends 52 and 54, specifically, between travel stops 56 and 58. Travel stops 56 and 58 are arranged in predetermined locations along line 50 so as to prevent the user from reaching an edge of a trailer, and thus falling off semi-trailer 20 at front 22 or rear 24. For example, as shown in FIG. 1, line L1 represents the limiting effect travel stop 56 has on line 70 and line L2 represents the limited effect travel stop 58 has on line 70. In some embodiments, line 70 comprises a tensioner and/or release device to allow the user to selectively tension line 70. In some embodiments, line 70 may comprise one or more stops to prevent the user from adding too much length to line 70. In some embodiments, line 70 may comprise one or more markers that allow the user to quickly shorten or lengthen line 70 to the appropriate length for the trailer size.

Line 80 is a cable, rope, strap, chain, string, or the like comprising end 82 and end 84. Line 80 is operatively arranged to be secured in a generally vertical fashion, and connects harness 100 to line 60. End 82 is slidingly connected to line 60 via connector 86 (e.g., clip carabiner, loop, D-ring, etc.). End 84 is connected to harness 100, as will be described in greater detail. End 82 is operatively arranged to slide along line 60 between ends 62 and 64, specifically, between travel stops 66 and 68. Travel stops 66 and 68 are arranged in predetermined locations along line 60 so as to prevent the user from falling off semi-trailer 20 at front 22 or rear 24. For example, as shown in FIG. 1, line L1 represents the limiting effect travel stop 66 has on line 80 and line L2 represents the limited effect travel stop 68 has on line 80. In some embodiments, line 80 comprises a tensioner and/or release device to allow the user to selectively tension line 80. In some embodiments, line 80 may comprise one or more stops to prevent the user from adding too much length to line 80. In some embodiments, line 80 may comprise one or more markers that allow the user to quickly shorten or lengthen line 80 to the appropriate length for the trailer size.

Figure 5:
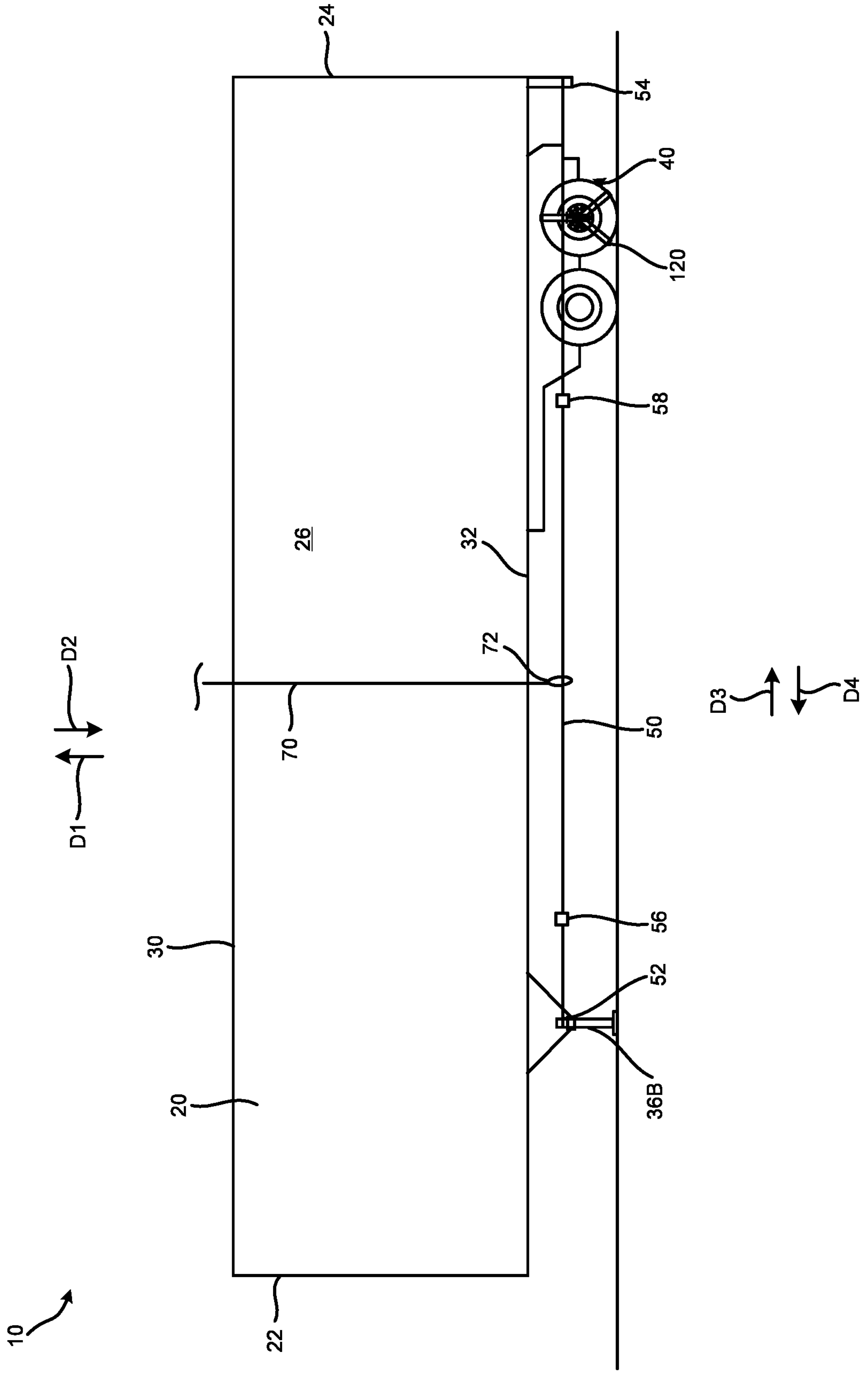
FIG. 5 is a side elevational view of a fall restraint assembly, in accordance with embodiments of the present disclosure.
Figure 6:
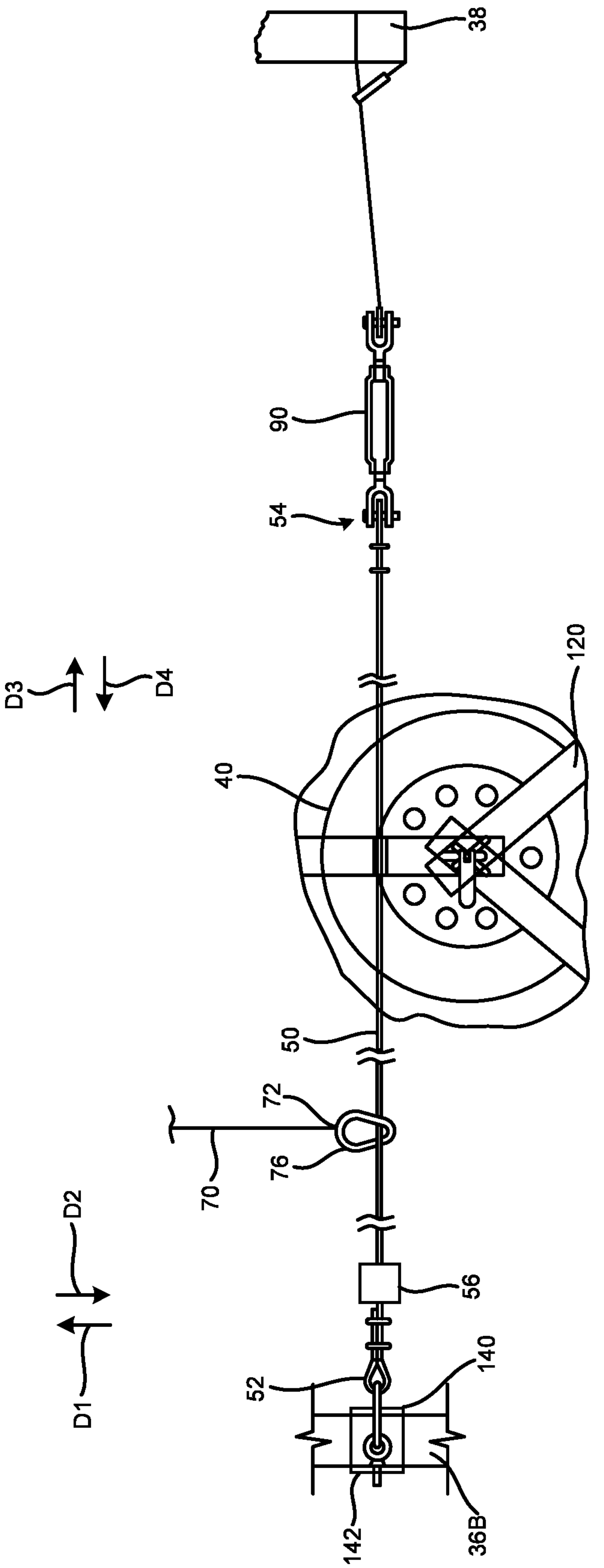
FIG. 6 is a partial elevational view of a fall restraint assembly, in accordance with embodiments of the present disclosure.
Figure 7:
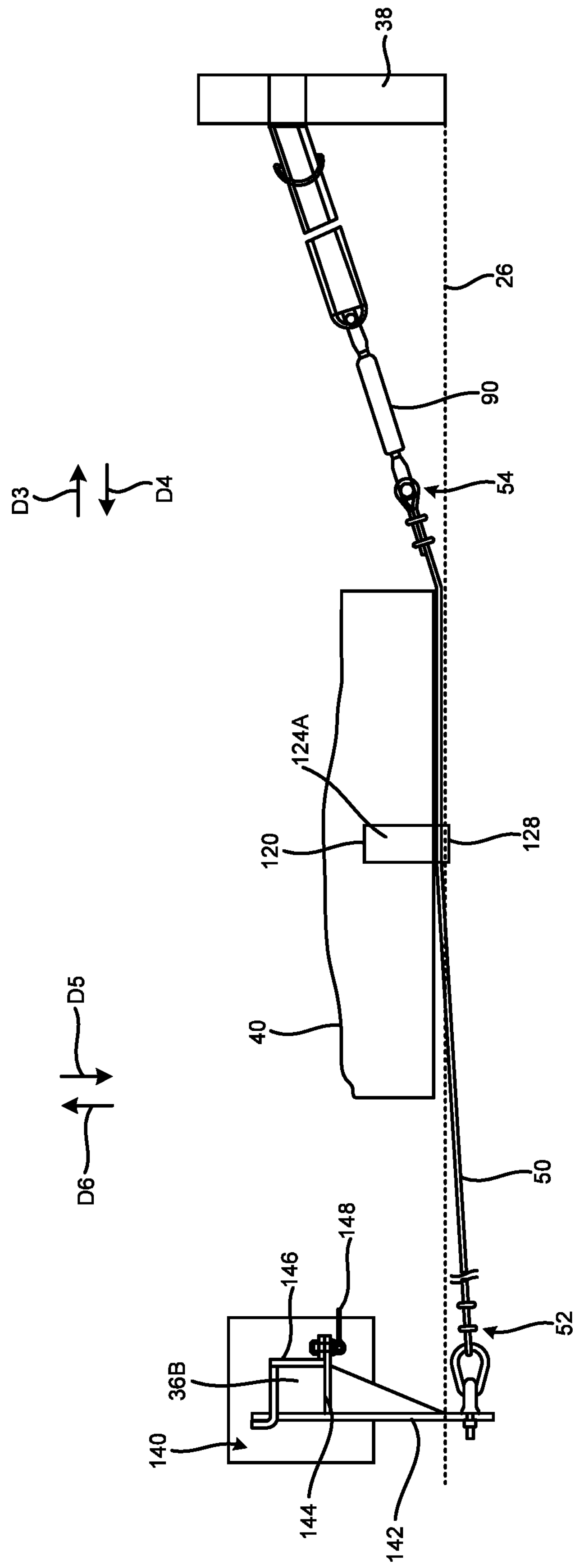
FIG. 7 is partial top elevational view of the fall restraint assembly shown in FIG. 6.
Figure 8:
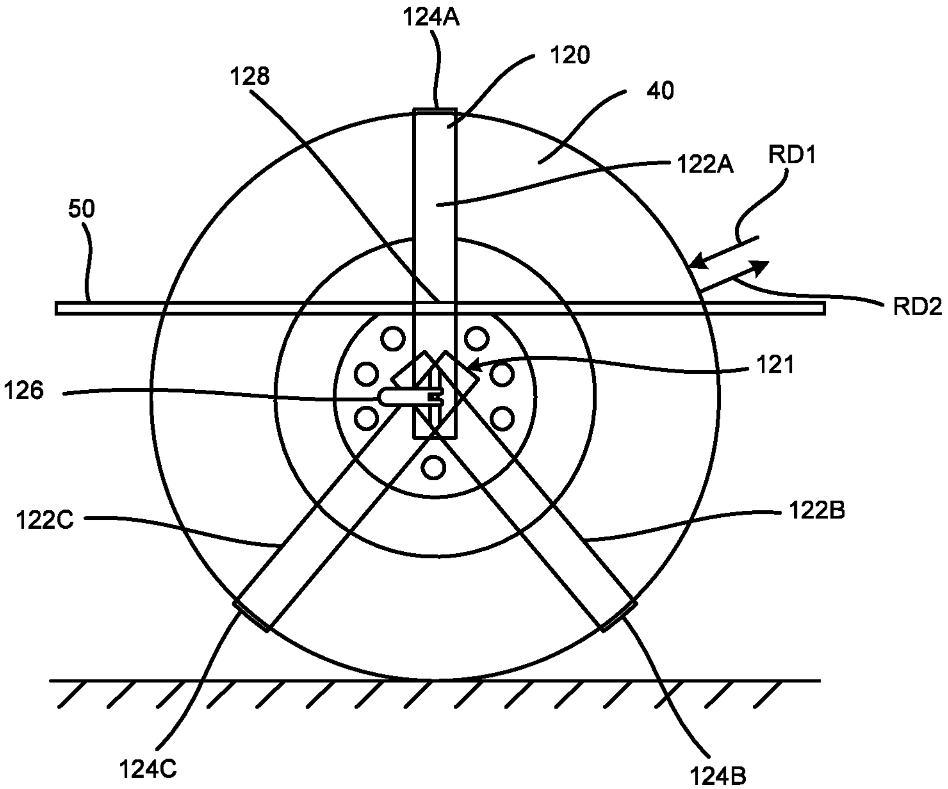
FIG. 8 is a partial side elevational view of a fall restraint assembly, in accordance with embodiments of the present disclosure.
Figure 9:
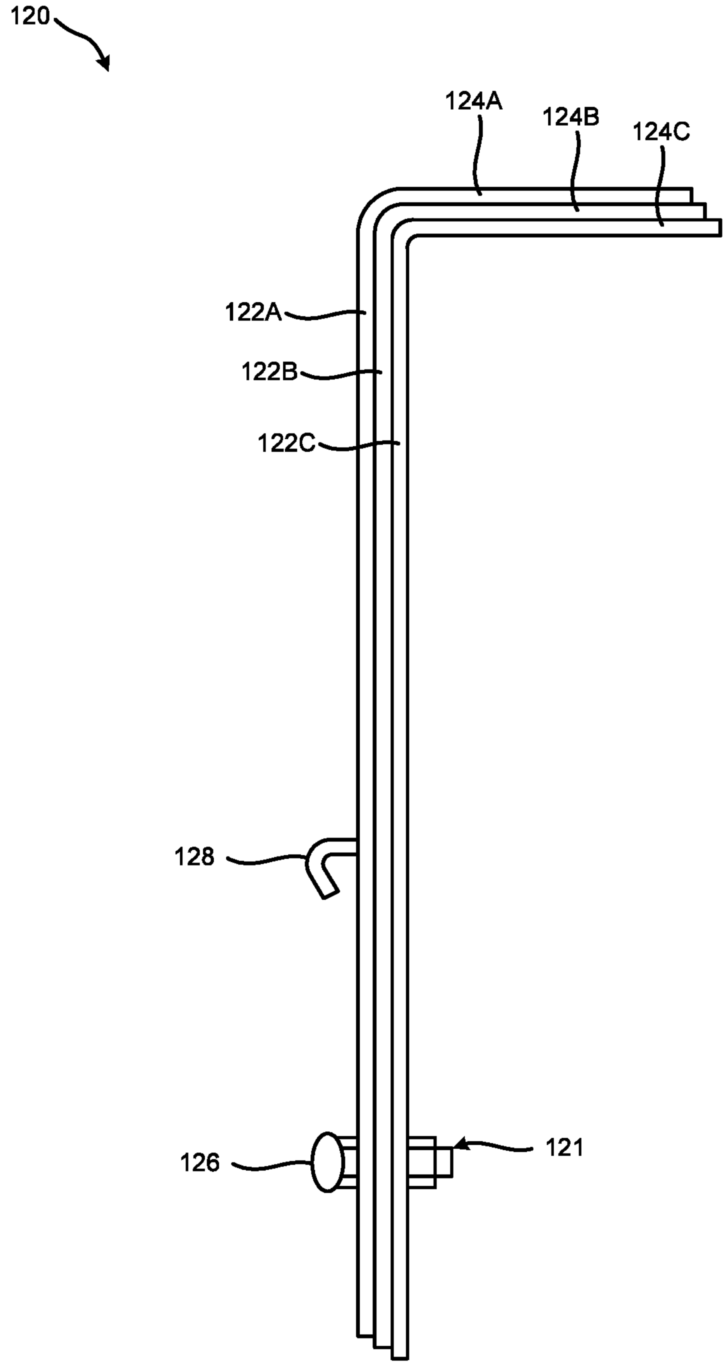
FIG. 9 is a front elevational view of the line guide assembly shown in FIG. 8, in a collapsed state, in accordance with embodiments of the present disclosure.

FIG. 5 is a side elevational view of fall restraint assembly 10. FIG. 6 is a partial elevational view of fall restraint assembly 10. FIG. 7 is partial top elevational view of fall restraint assembly 10. FIG. 8 is a partial side elevational view of fall restraint assembly 10. FIG. 9 is a front elevational view of line guide assembly 120, in a collapsed state.

In some embodiments, fall restraint assembly further comprises a line guide operatively arranged to further support and/or position line 50, 60 relative to semi-trailer 20, for example sheath 78, 88 as previously described, or line guide assembly 120. Line guide assembly 120 is operatively arranged to be connected to semi-trailer 20, for example, wheel 40. In some embodiments, line guide assembly 120 comprises a plurality of arms, for example, arms 122A-C, pivotably connected. Each of arms 122A-C comprises a proximal end pivotably connected via pivot point 121, and a distal end comprising a plate, for example plates 124A-C, respectively. In some embodiments, plates 124A-C are arranged substantially perpendicular to arms 122A-C, respectively. Each of arms 122A-C is adjustable in radial direction RD1 and radial direction RD2 with respect to pivot point 121 until plates 124A-C are arranged to engage a radially outward facing surface of wheel 40. In some embodiments, plates 124A-C comprise a flange that engages the inside surface of the wheel 40, opposite arms 122A-C, to prevent line guide assembly 120 from sliding off of wheel 40. In some embodiments, arms 122A-C are slidably connected to pivot point 121, for example via slots and a bolt. Once plates 124A-C are engaged with or arranged proximate to the radially outward facing surface of wheel 40, as shown in FIG. 8, clamping handle 126 is engaged. Clamping handle 126 is operatively arranged to lock arms 122A-C with respect to pivot point 121. In some embodiments, clamping handle 126 also displaces arms 122A-C in radial direction RD1 such that plates 124A-C further engage the radially outward facing surface of wheel 40. In some embodiments, clamp or clamping handle 126 comprises a nut and a bolt. This allows line guide assembly 120 to be secured/clamped to wheel 40. In some embodiments, plates 124A-C engage wheel 40 at various circumferential locations thereon (e.g., arms 122A-C are arranged approximately sixty degrees from each other).

Line guide assembly 120 further comprises connector or hook 128. As shown in FIG. 9, connector 128 is generally a bent piece of material (e.g., metal) that extends from one of the arms, for example, arm 122A. Connector 128 is arranged at a predetermined location along arm 122A between pivot point 121 and plate 124A to engage line 50, 60. The engagement of line 50, 60 with connector 128 maintains the positioning of line 50, 60 to prevent or reduce engagement of line 50, 60 with wheel 40. The engagement of line 50, 60 with connector 128 also counteracts any upward force on line 50, 60 from line 70, 80 (i.e., from a user approaching or falling from an edge of semi-trailer 20). In some embodiments, line guide assembly 120 may be retracted for easy storage and transport, as shown in FIG. 9. In some embodiments, line guide assembly 120 is connected to an inner wheel 40 of semi-trailer 20, and connector 128 extends out past a lateral side of semi-trailer 20.

In some embodiments, fall restraint assembly 10 comprises a rear wheel securement assembly including plates that press outward on the internal surface of the rim of wheel 40 with an outward tab to prevent line 50, 60 from displacing in direction D1 (or direction D2) when under load.

In some embodiments, fall restraint assembly 10 comprises connector 140 operatively arranged to connect line 50, 60 to landing gear 34 (e.g., leg 36A, 36B). Connector 140 acts as a standoff, thereby holding line 50, 60 at a distance from leg 36A, 36B. As best shown in FIG. 7, connector 140 comprises plate 142, plate 144 connected to plate 142, and plate 146. Plate 146 is engaged (e.g., pivotably engaged) with plate 142 at a first end and connectable to plate 144 at a second end, for example, via clamping handle 148. Plate 142 engages a first side of leg 36A, 36B and plate 144 engages a second side of leg 36A, 36B, adjacent the first side. Plate 146 is wrapped around the rest of leg 36A, 36B (i.e., the third and forth sides) and clamping handle 148 squeezes plates 142, 144, and 146 around leg 36A, 36B to secure connector 140 to leg 36A, 36B. In the embodiment shown, plate 142 acts as the standoff portion of connector 140, shifting the connection point between end 52 and leg 36B in direction D5. This enables line 50 to maintain position outward from side 26, 28 of semi-trailer 20 (i.e., to reduce abrasion of the line 50, 60 and provide clearance between line 50, 60 and any under-trailer aerodynamic components). In some embodiments, connector 140 comprises one or more shims or plates operatively arranged to fill a gap between connector 140 and leg 36A, 36B.

Figure 10:
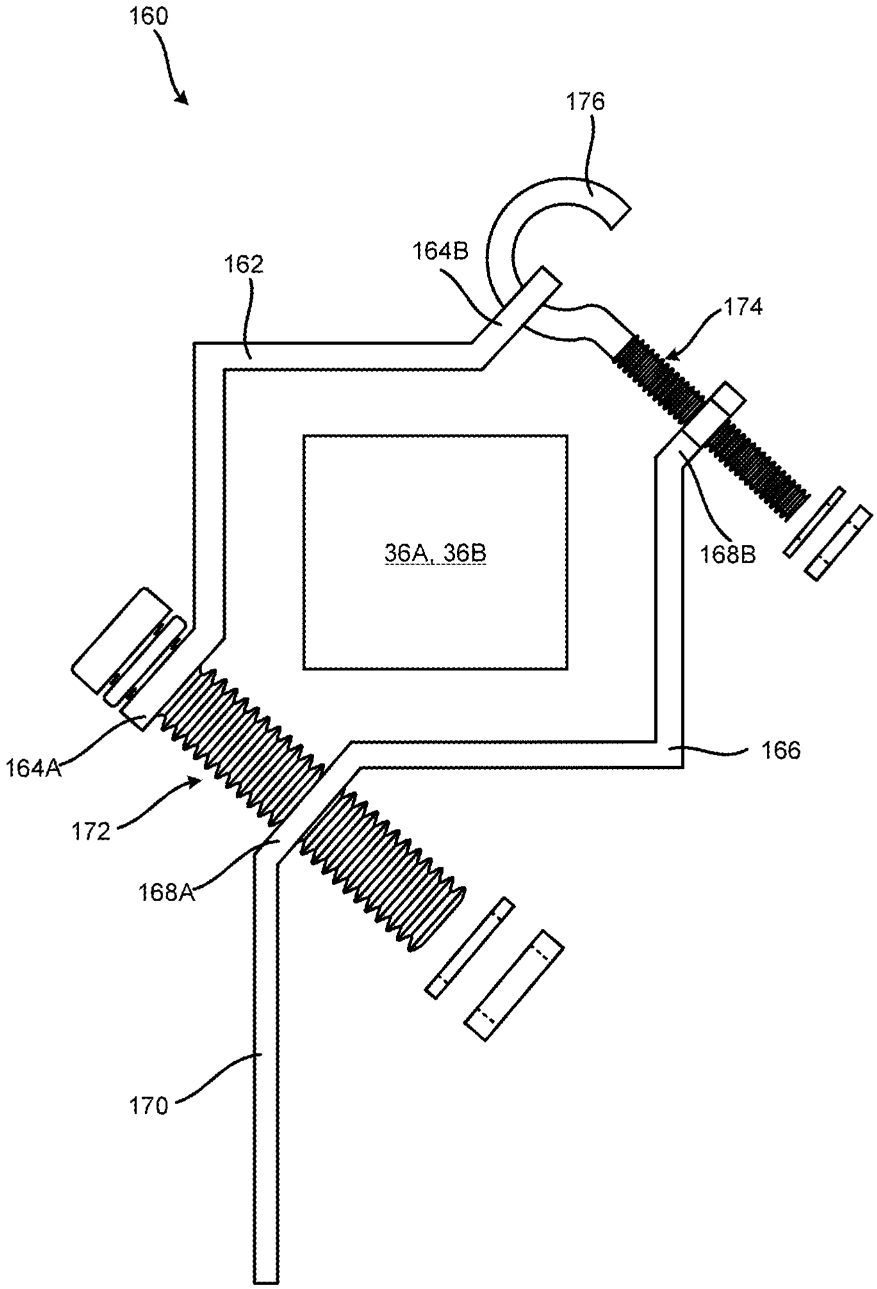
FIG. 10 is a top elevational view of a connector, in accordance with embodiments of the present disclosure.

In some embodiments, as shown in FIG. 10, fall restraint assembly comprises connector 160 operatively arranged to connect line 50, 60 to landing gear 34 (e.g., leg 36A, 36B). Connector 160 acts as a standoff, thereby holding line 50, 60 at a distance from leg 36A, 36B. Connector 160 comprises plate 162 and plate 166. Plate 162 is engaged with a first side of leg 36A, 36B and comprises flange 164A and flange 164B. Plate 166 is engaged with a second side 5 of leg 36A, 36B and comprises flange 168A and flange 168B. Flange 164A is operatively arranged to engage and be secured to flange 168A, for example via fastener 172. Flange 164B is operatively arranged to engage and be secured to flange 168B, for example via fastener 174. Fastener 172 and/or fastener 174 may comprise a threaded bolt, nut, and one or more washers. To assembly connector 160, plates 162 and 166 are engaged with respective sides of leg 36A, 36B and are fastened together, thus clamping plates 162 and 166 around leg 36A, 36B. In some embodiments, fasteners 172 and 174 engage slots in respective flanges such that connector 160 can be connected to various sized landing gear legs and components (i.e., flanges 164A-B and 168A-B comprise slotted holes). In some embodiments, fastener 174 is pivotably connected to plate 162 or flange 164B, for example, via hook or hinge 176. In such embodiments, the pivotable connection of plates 162 and 166 on a first side facilitates easier assembly of connector 160 to leg 36A, 36B. In some embodiments, connector 160 further comprises projection 170 connected to one of plates 164 and 166 operatively arranged to be connect to line 50, 60. Projection 170 acts as the standoff portion of connector 160, shifting the connection point between line 50, 60 outward (i.e., in direction D5, D6), thereby maintaining line 50, 60 outward from side 26, 28 of semi-trailer 20 (i.e., to reduce abrasion of the line 50, 60 and provide clearance between line 50, 60 and any under-trailer aerodynamic components). In some embodiments, connector 160 comprises one or more shims or plates operatively arranged to fill a gap between connector 160 and leg 36A, 36B.

It should be appreciated that other mechanisms may be used for connecting lines 50 and 60 to landing gear 34 and bumper 38, for example, a J-hook or a cable wrapped around landing gear 34/bumper 38 and clamped. In some embodiments, ends 52 and 62 could be attached to the front hitch of semi-trailer 20. In some embodiments, lines 50 and 60 are formed from a single line wherein a first end of the line is connected to bumper 38, the single line is wrapped around, or through the gussets of, legs 36A and 36B, and the second end of the line is connected to bumper 38. In some embodiments, fall restraint assembly 10 comprises a single line running from proximate or at rear 24 to landing gear 34 or front 22 (e.g., the trailer hitch). In some embodiments, lines 50 and/or 60 are connected via frame clamp for connection to any plate steel on landing gear 34, for example, the landing gear gusset, or an underside metal lip of semi-trailer 20.

Figure 11:
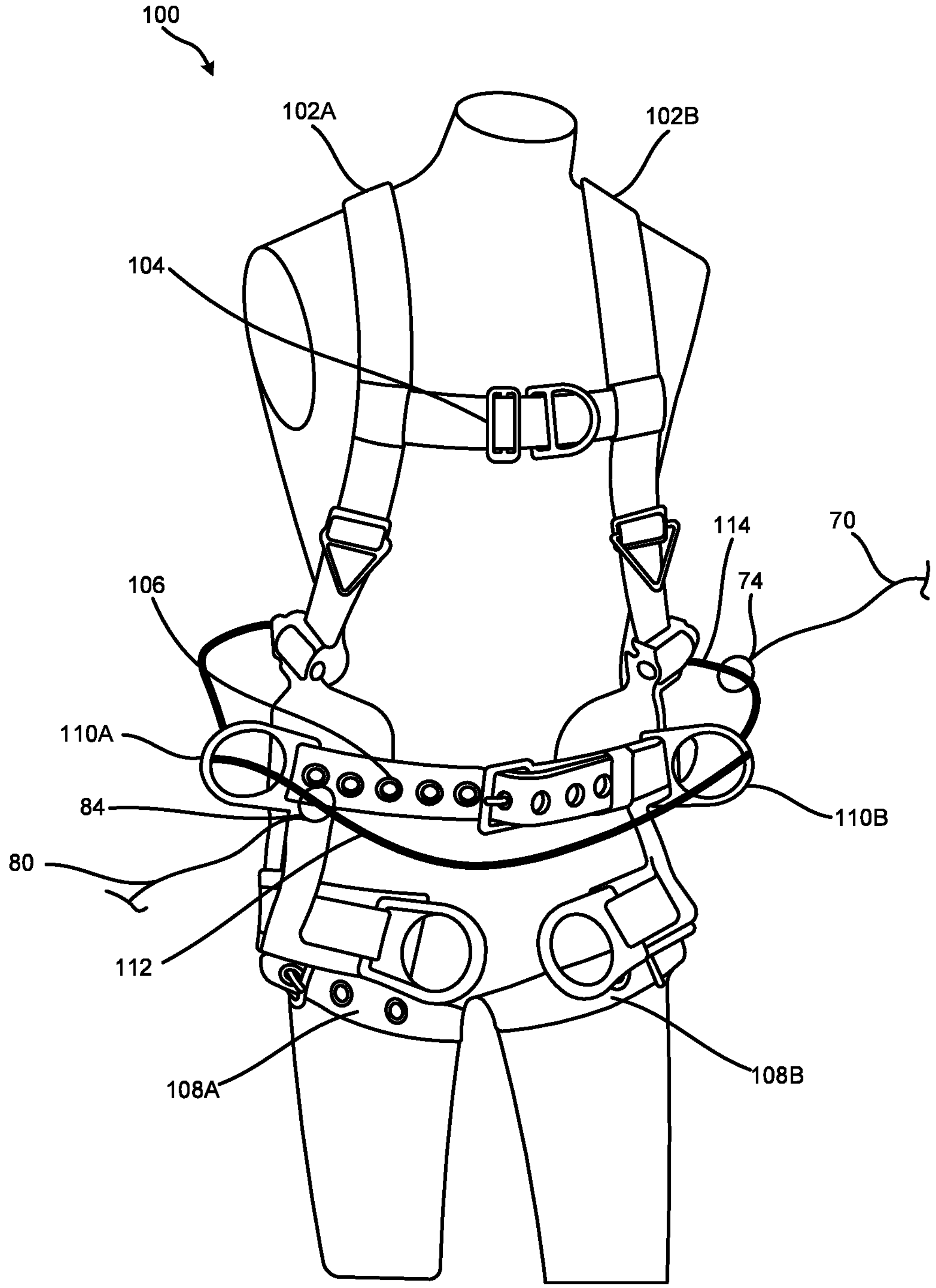
FIG. 11 is a perspective view of a harness, in accordance with embodiments of the present disclosure.

FIG. 11 is a perspective view of harness 100. Harness 100 generally comprises a plurality of adjustable straps and at least one anchor loop, for example, anchor loop 110A and anchor loop 110B. In some embodiments, harness 100 comprises one or more shoulder straps, for example, shoulder strap 102A and shoulder strap 102B. In some embodiments, strap 104 connects straps 102A-B, for example, across the user's chest. In some embodiments, shoulder straps 102A-B are connected to waste strap or belt 106. In some embodiments, harness 100 comprises one or more leg straps, for example, leg strap 108A and leg strap 108B, connected to waist strap 106. Anchor loops 110A-B are connected to waste strap 106, for example, on opposite sides thereof (e.g., on each hip of the user). In some embodiments, harness 100 comprises one or more connecting line, for example, connecting line 112 and connecting line 114. Connecting line 112 is connected at a first end to anchor loop 110A and a second end to anchor loop 110B, and extends around the front of the user. Connecting line 114 is connected at a first end to anchor loop 110A and a second end to anchor loop 110B, and extends around the rear of the user. Connecting lines 112 and 114 allow for greater rotational movement of the user when lines 70 and 80 are secured to harness 100, as will be described in greater detail below.

Since line 70 is connected to harness 100 about side 26 of semi-trailer 20 and line 80 is connected to harness 100 about side 28 of semi-trailer 20, the user is prevented from falling off of top 30 along sides 26 and 28. Additionally, and as previously described, travel stops on lines 50 and 60 prevent the user from falling off top 30 along front 22 and rear 24. In some embodiments, line 70 and/or line 80 are connected directly to anchor loop 110A and/or anchor loop 110B. For example, end 74 is connected to anchor loop 110B and end 84 is connected to anchor loop 110A and end 84 is connected to anchor loop 110A via any suitable means (e.g., clip carabiner, loop, D-ring, knot, etc.). In some embodiments, line 70 and/or line 80 are connected to connecting lines to allow the user greater rotational movement. For example, end 74 is slidably connected to connecting line 114 and end 84 is slidably connected to connecting line 112. Thus, due to the sliding connection of harness 100 to lines 70 and 80 (via connecting lines 112 and 114), the user may rotate while on top 30 without increasing or decreasing the tension in lines 70 and 80. It should be appreciated that connecting lines 112 and 114 may be rigid (e.g., metal rods) so as to facilitate sliding connection with ends 74 and 84. In some embodiments, harness 100 comprises a ball bearing "hula hoop" design that is fixedly attached to both the harness and lines 70, 80.

In some embodiments, the various components of fall restraint assembly 10 may be color coated to allow for greater case of assembly. For example, line 70, line 50, connecting line 114, and/or anchor loop 110B may be the same color indicating that they all connect together. Likewise, line 80, line 60, connecting line 112, and/or anchor loop 110A may be the same color indicating that they all connect together. In some embodiments, various components of fall restraint assembly 10 may be color coated to reference various sized semi-trailers. For example, blue lines 50, 60 may indicate they are sized for a forty-eight foot trailer whereas green lines 50, 60 may indicate they are sized for a fifty-three foot trailer. In some embodiments, the various lines of fall restraint assembly 10 are adjustable such that they can fit any size semi-trailer. In some embodiments, lines of fall restraint assembly 10 may have markings indicating various lengths. In some embodiments, lines 70 and 80 are adjustable and comprise markings indicating correct lengths with respect to various sized trailers. In some embodiments, harness 100 is color coated to facilitate ease of adjustment based on the user (e.g., height and weight of the user).

It should be appreciated that, while ends 52 and 62 are shown connected to legs 36A and 36B, respectively, lines 50 and 60 may be connected to any mounting point at a forward location of semi-trailer 20 (i.e., proximate front 22). For example, ends 52, 62 may be connected to landing gear (e.g., leg, gusset, leg sleeve, etc.), the semi-trailer body, etc.

Fall restraint assembly 10 is a multi-axis, semi-restricted movement system whereby the user can be safely harnessed and protected from a fall. The user motion is restricted via opposite axial lines 50, 60 applying opposing force such that the user always has one or both lines 70, 80 under tension from either side of the structure they are working on.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Fall restraint assembly
20 Semi-trailer or tractor-trailer
22 Front
24 Rear
26 Side
28 Side
30 Top
32 Bottom
34 Landing gear or front support
36A Leg
36B Leg
38 Bumper or rear impact guard
40 Wheel(s)
50 Line
52 End
54 End
56 Travel stop
58 Travel stop
60 Line
62 End
64 End
66 Travel stop
68 Travel stop
70 Line
72 End
74 End
76 Connector
78 Sheath or tube
80 Line
82 End
84 End
86 Connector
88 Sheath or tube
90 Tensioner
92 Tensioner
100 Harness
102A Shoulder strap
102B Shoulder strap
104 Strap
106 Waist strap
108A Leg strap
108B Leg strap
110A Anchor loop
110B Anchor loop
112 Connecting line
114 Connecting line
120 Line guide assembly
121 Pivot point
122A Arm
122B Arm
122C Arm
124A Plate
124B Plate
124C Plate
126 Clamping handle
128 Connector or hook
140 Connector
142 Plate
144 Plate
146 Plate
148 Clamping handle
160 Connector
162 Plate
164A Flange
164B Flange
166 Plate
168A Flange
168B Flange
170 Projection
172 Fastener
174 Fastener
176 Hook or hinge
D1 Direction
D2 Direction
D3 Direction
D4 Direction
D5 Direction
D6 Direction
L1 Line
L2 Line
L3 Line
RD1 Radial direction
RD2 Radial direction

What is claimed is:

1. A fall restraint assembly, comprising:

a harness, including:

a first anchor loop;

a second anchor loop;

a first connecting line extending from the first anchor loop to the second anchor loop in a first circumferential direction; and a second connecting line extending from the first anchor loop to the second anchor loop in a second circumferential direction, opposite the first circumferential direction;

at least one base line including a first end and a second end;

a first line including a third end slidingly connected to the at least one base line and a fourth end connected to the harness; and a second line including a fifth end slidingly connected to the at least one base line and a sixth end connected to the harness;

wherein the fourth end is slidably connected to the first connecting line and the sixth end is slidably connected to the second connecting line.

2. The fall restraint assembly as recited in claim 1, wherein:

the at least one base line comprises a first base line and a second base line;

the first line is connected to the first base line; and the second line is connected to the second base line.

3. The fall restraint assembly as recited in claim 1, wherein the first end is fixedly secured at a first point and the second end is fixedly secured at a second point.

4. The fall restraint assembly as recited in claim 1, wherein the at least one base line comprises at least one travel stop operatively arranged to prevent displacement of the third end.

5. The fall restraint assembly as recited in claim 1, wherein the at least one base line comprises a tensioner.

6. The fall restraint assembly as recited in claim 1, further comprising a line guide assembly, the line guide assembly including a connector operatively arranged to engage the at least one base line.

7. The fall restraint assembly as recited in claim 6, wherein the line guide assembly further comprises:

a first arm;

a second arm pivotably and translatably connected to the first arm; and a clamp operatively arranged to lock the second arm with respect to the first arm.

8. The fall restraint assembly as recited in claim 6, wherein the line guide assembly comprises a sheath.

9. The fall restraint assembly as recited in claim 1, wherein the harness comprises:

a plurality of straps; and at least one anchor loop, wherein at least one of the fourth end and the sixth end are connected to the at least one anchor loop.

10. The fall restraint assembly as recited in claim 1, wherein the first end comprises a standoff connector.

11. A fall restraint assembly for a semi-trailer including a forward fixation point and a rear fixation point, the fall restraint assembly comprising:

a harness including:

a first anchor loop;

a second anchor loop;

a first connecting line extending from the first anchor loop to the second anchor loop in a first circumferential direction; and a second connecting line extending from the first anchor loop to the second anchor loop in a second circumferential direction, opposite the first circumferential direction;

a first base line including a first end arranged to be connected proximate the forward fixation point and a second end arranged to be connected proximate the rear fixation point;

a second base line including a third end arranged to be connected proximate the forward fixation point and a fourth end arranged to be connected proximate the rear fixation point;

a first line including a fifth end slidingly connected to the first base line and a sixth end connected to the harness; and a second line including a seventh end slidingly connected to the second base line and an eighth end connected to the harness;

wherein the sixth end is slidably connected to the first connecting line and the eighth end is slidably connected to the second connecting line.

12. The fall restraint assembly as recited in claim 11, wherein at least one of the first base line and the second base line comprises at least one travel stop.

13. The fall restraint assembly as recited in claim 11, further comprising a line guide assembly, the line guide assembly including a connector operatively arranged to engage the first base line.

14. The fall restraint assembly as recited in claim 13, wherein the line guide assembly further comprises:

a first arm;

a second arm pivotably and translatably connected to the first arm; and a clamp operatively arranged to lock the second arm with respect to the first arm.

15. The fall restraint assembly as recited in claim 11, wherein the harness comprises:

a plurality of straps; and at least one anchor loop, wherein at least one of the sixth end and the eighth end are connected to the at least one anchor loop.

16. The fall restraint assembly as recited in claim 11, wherein at least one of the first base line, the second base line, the first line, and the second line comprises a tensioner.

* * * * *